United States Patent [19]

Stuart

[11] Patent Number: 4,519,464
[45] Date of Patent: May 28, 1985

[54] WEIGHING SCALE WITH ADJUSTABLE SUSPENSION AND THERMAL COMPENSATION

[75] Inventor: James M. Stuart, Malvern, Pa.
[73] Assignee: Malvern Scale Company, Malvern, Pa.
[21] Appl. No.: 535,450
[22] Filed: Sep. 23, 1983
[51] Int. Cl.³ .................... G01G 21/12; G01G 21/28
[52] U.S. Cl. ............... 177/244; 177/210 C; 177/255
[58] Field of Search ............ 177/128, 210 C, 255, 177/244

[56] References Cited

U.S. PATENT DOCUMENTS 4,015,678 4/1977 Wirth et al. .................... 177/244
4,372,405 2/1983 Stuart .......................... 177/210 C

FOREIGN PATENT DOCUMENTS 96426 7/1980 Japan ........................... 177/128

Primary Examiner—E. A. Goldberg
Assistant Examiner—Patrick W. Foster
Attorney, Agent, or Firm—Cassar, Rivise, Bernstein & Cohen

[57] ABSTRACT

A scale used for weighing an object or material. The scale includes a platform arranged to move upon receipt of a material thereon, frame means, a variable capacitor having a movable plate and a stationary plate, springs means which is coupled both to the frame means and to the platform, suspension means for coupling the platform to the frame means and leg support means for supporting the scale on a supporting surface. The suspension means includes an assembly having a horizontally disposed bar which is flexible in the up/down direction so as to permit ready adjustment of that assembly. The movable plate support means includes a bracket member having a thin flexible finger portion which is joined to the frame means so as to preclude distortion of the frame assembly from being transmitted to the upper capacitor plate. The lower capacitor plate is coupled to the spring means by a bracket which includes a thick portion and a thin portion. The thin portion is connected to the capacitor plate and is rigid in the up/down direction but flexible in other directions so as to permit the movable plate to expand or contract due to thermal or other effects. The frame assembly includes a vertical end plate and side elements such that the side elements are connected to the vertical end plate in a manner designed to minimize distortion and twist from being transmitted from the vertical plate to the other portions of the frame. The leg support means includes three legs, one of which includes a thin flexible stem portion enabling it to flex or twist so as to permit the scale to remain undeformed by an uneven supporting surface.

31 Claims, 10 Drawing Figures

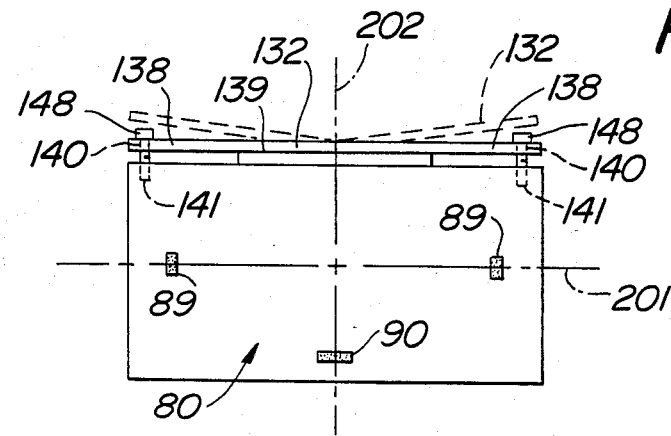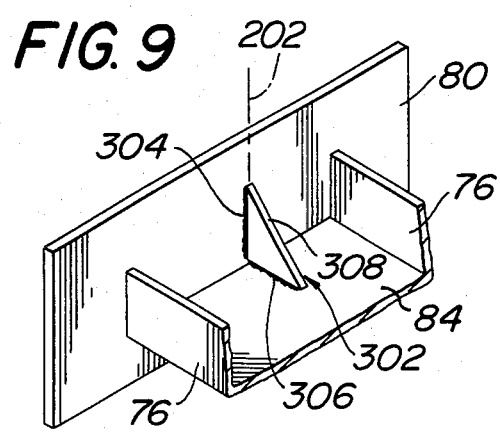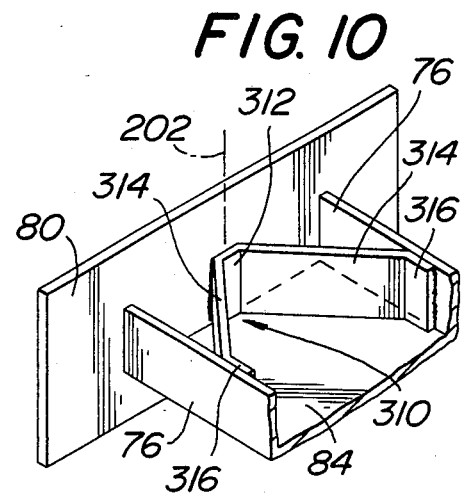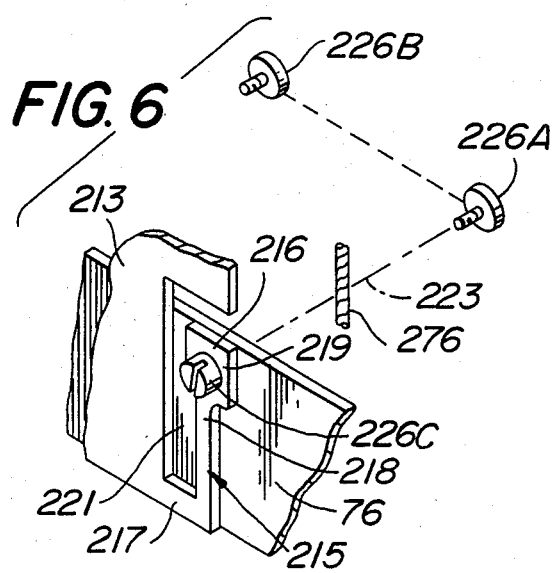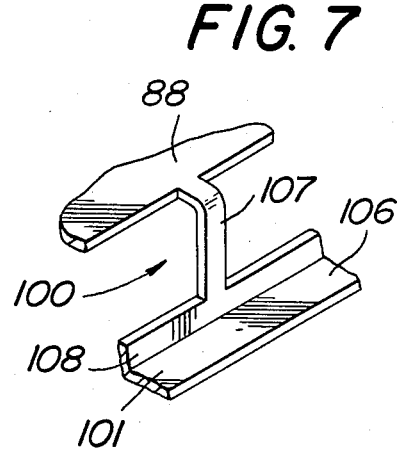

WEIGHING SCALE WITH ADJUSTABLE SUSPENSION AND THERMAL COMPENSATION

BACKGROUND OF THE INVENTION

This invention relates generally to measuring apparatus and more particularly to an electronic scale device.

Various electronic scales are commercially available for providing a digital display of the weight of a body placed on a weighing pan. Many of the recently developed scales make use of integrated circuits and microcomputer controls for perfecting various scale operations such as weighing, counting, altering resolution, converting units, etc. In this regard, these devices must not only include electronic transducer means (e.g., a variable capacitor) and other electronic circuitry but must also include mechanical means for interfacing between the electronic circuitry and the weighing pan.

The mechanical interfacing means generally comprises spring means for biasing the pan in a direction opposite to that of the gravitational force exerted upon the pan by the load being weighed and a mechanical assembly including frame means for coupling the weighing pan to the transducer means.

Referring to the prior art, U.S. Pat. Nos. 4,043,415 (Luchinger), 4,158,395 (Brown) and 3,986,571 (Strobel) disclose capacitive weighing scales utilizing electronic circuitry and mechanical interfacing means for weighing an object. Although these devices generally appear suitable for their intended purposes, none of said patents disclose the various features of the Applicant's scale, which serve to provide the Applicant's scale with greater weighing accuracy and enhanced reliability.

OBJECTS OF THE INVENTION

Accordingly, it is a general object of the invention to provide an electronic scale which overcomes the disadvantages of the prior art.

It is another object of the invention to provide an electronic scale which utilizes frame and support means designed to counteract the effects of an uneven supporting surface or of various twisting moments likely to be encountered by the scale during its normal operation.

It is a further object of the invention to provide an electronic scale which utilizes mechanical support means for supporting a variable capacitor in a manner which insures that the capacitor's plates remain properly positioned during the weighing process.

It is still a further object of the invention to provide an electronic scale which includes readily adjustable parallelogram means for counteracting the effects of an off-centered load on the scale's weighing platform.

It is still a further object of the invention to provide an electronic scale which is durable, relatively simple in construction and may readily be used to accurately and reliably weigh a material or object.

SUMMARY OF INVENTION

These and other objects of the instant invention are readily achieved by providing a scale which can be used to weigh or otherwise measure other parameters of an unknown material or object. The device includes various mechanical or constructional features designed to enhance the scale's weighing accuracy, reliability and ease of operation. In this regard, the scale basically comprises frame means including a vertically extending end plate, platform means arranged to move upon receipt of some material thereon, a suspension system for coupling the platform means to the frame means, variable capacitance means including a stationary plate and a movable plate, movable support means for coupling the movable plate to the platform means, stationary support means for supporting the stationary plate and leg support means for supporting the scale on a generally horizontal surface.

In accordance with one aspect of the invention, the suspension system serves to prevent weighing inaccuracies from occurring when an off-centered load is placed on the platform means. The suspension system includes a pair of legs each of which is coupled at one end to the platform means and at an opposite end to the frame means. The means for coupling the legs to the frame means includes a horizontally disposed elongated member which rests upon the top edge of the vertically extending plate and adjustable securement means. The elongated member is flexible in an up/down direction but rigid in all other directions and includes and intermediate portion and a pair of upwardly biased free ends. The intermediate portion is fixedly attached to the top edge of the vertically extending plate and each respective end is adjustably secured to the plate by adjustable securement means. Thus, each of the legs is connected to the elongated member adjacent a respective free end such that the vertical angle of each respective leg is readily adjusted using the adjustable securement means. Accordingly, an end of each respective leg is lowered by manually positioning the adjustable securement means so as to urge the free end of the elongated member downward and is raised by manually positioning the adjustable securement means so as to permit the upwardly biased free end to move upward.

In accordance with another aspect of the invention, the movable capacitor plate includes a generally planar horizontal surface and a generally vertically disposed flanged portion located bout the periphery of the horizontal surface, wherein the movable support means for coupling the movable plate to the spring means includes bracket means having a generally rigid portion and a thin portion. The rigid portion is adjacent the spring means and the thin portion is connected to the flanged portion of the movable capacitor plate. The thin portion is rigid in the up/down direction but flexible in other directions so that the thin portion is readily able to bent in a horizontal plane to accommodate changes in size and shape of the movable plate attributable to thermal or other effects.

In accordance with a further aspect of the invention, the stationary plate is coupled to the frame means by bracket means which include first and second vertically extending side portions, an interconnecting bridging portion and projecting means. The projecting means is connected to and supports the stationary plate at its desired location. The first side portion includes a flexible, finger portion having a free end. The finger portion is generally co-planar with the first side portion, with the free end being joined to a vertically extending side frame element of the frame means. The second side portion is joined to the other vertically extending side frame element such that any twisting or distortion of the frame means results in the finger portion flexing, thus preventing distortion or twist from being transmitted to the other portions of the bracket. This arrangement thus insures that positional changes in the stationary plate do not occur.

In accordance with still a further aspect of the invention, the vertically extending end plate is coupled to the side frame elements and the cross frame elements at generally right angles and only at three joints. The three joints include a first joint, a second and a third joint such that the first and second joints connect the vertical end plate with respective side frame elements and are located adjacent the end plate's horizontal center line and the third joint connects the end plate to the cross frame element and is located adjacent the end plate's vertical center line. Thus, twisting or distortion of the vertical plate due to an off-centered load being placed on the platform means is not readily transmitted to the side frame elements and thus does not cause the side frame elements to twist or distort in a manner which would tend to introduce error into the weighing process.

In accordance with still a further aspect of the invention, the scale's leg support means comprises first, second and third leg members, wherein the first leg member includes a flexible, generally vertically extending stem portion which is able to bend or twist. The bending or twisting of the stem portion insures that the scale is disposed in a horizontal fashion and prevents undue twisting of the frame means, when the scale is being supported by an uneven surface.

DESCRIPTION OF THE DRAWING

Other objects and many of the attendant advantages of the invention are readily appreciated as the same becomes better understood by reference to the following detailed description when considered in connection with the accompanying drawing wherein:

FIG. 6 is an enlarged perspective view, partially broken away, of a portion of the scale, showing how the upper capacitor plate support means is mounted to the frame assembly;

FIG. 7 is an enlarged perspective view, partially broken away, of one of the scale's supporting legs;

FIG. 8 is an enlarged elevational view of a portion of the scale, showing in phantom lines the scale's upper parallelogram adjustment bar in an upwardly biased position; and FIGS. 9 and 10 are each enlarged perspective views, partially broken away, of first and second alternative embodiments, respectively, of the scale's frame assembly, showing alternative means for attaching the side and bottom portions of the frame assembly to the scale's vertically extending end frame element.

DETAILED DESCRIPTION OF THE PREFERRED EMBODIMENT

Figure 1:
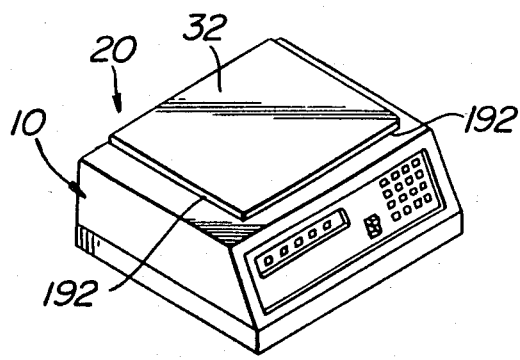
FIG. 1 is a perspective view of an electronic scale constructed in accordance with the instant invention.

Referring now to the various figures of the drawing wherein like reference characters refer to like parts, there is shown at 20 in FIG. 1 an electronic scale constructed in accordance with the instant invention.

Although the device 20 is referred to as a "scale" throughout this patent application, it should be understood that the instant invention is not limited to that of a "weighing" device but can also be used for determining the mass, density, volume and other parameters of a liquid or solid, whenever weight can be used as a factor in making such a determination. In this regard, the utilization of the scale 20 for purposes other than "weighing" is shown and described in my prior U.S. Pat. No. 4,372,405, whose disclosure is hereby incorporated by reference, herein.

It should further be pointed out that notwithstanding the fact that the preferred embodiment of this invention relates to an electronic scale, many of the features claimed and disclosed in this patent application are applicable to other types of scales as well (e.g., scales which operate by purely mechanical means).

In this regard, the instant invention relates not to the scale's electronic circuitry which is conventional but to an improved mechanical construction for achieving greater measuring accuracy, ease of operation and reliability. To that end, the scale 20 is a self-contained, solid state device, which is readily used for measuring the weight or other parameters of an unknown liquid or solid and for providing a digital reading of the weight or other parameter being measured. The device 20 basically comprises a frame assembly 24 (FIG. 3) for supporting various mechanical and electrical components within the scale's casing 10 (FIG. 1), a suspension system 28 mounted on the frame assembly and supporting the platform or pan 32 (FIG. 1) and displacement responsive transducer means 36 coupled to the suspension system and thus to the pan.

Figure 3:
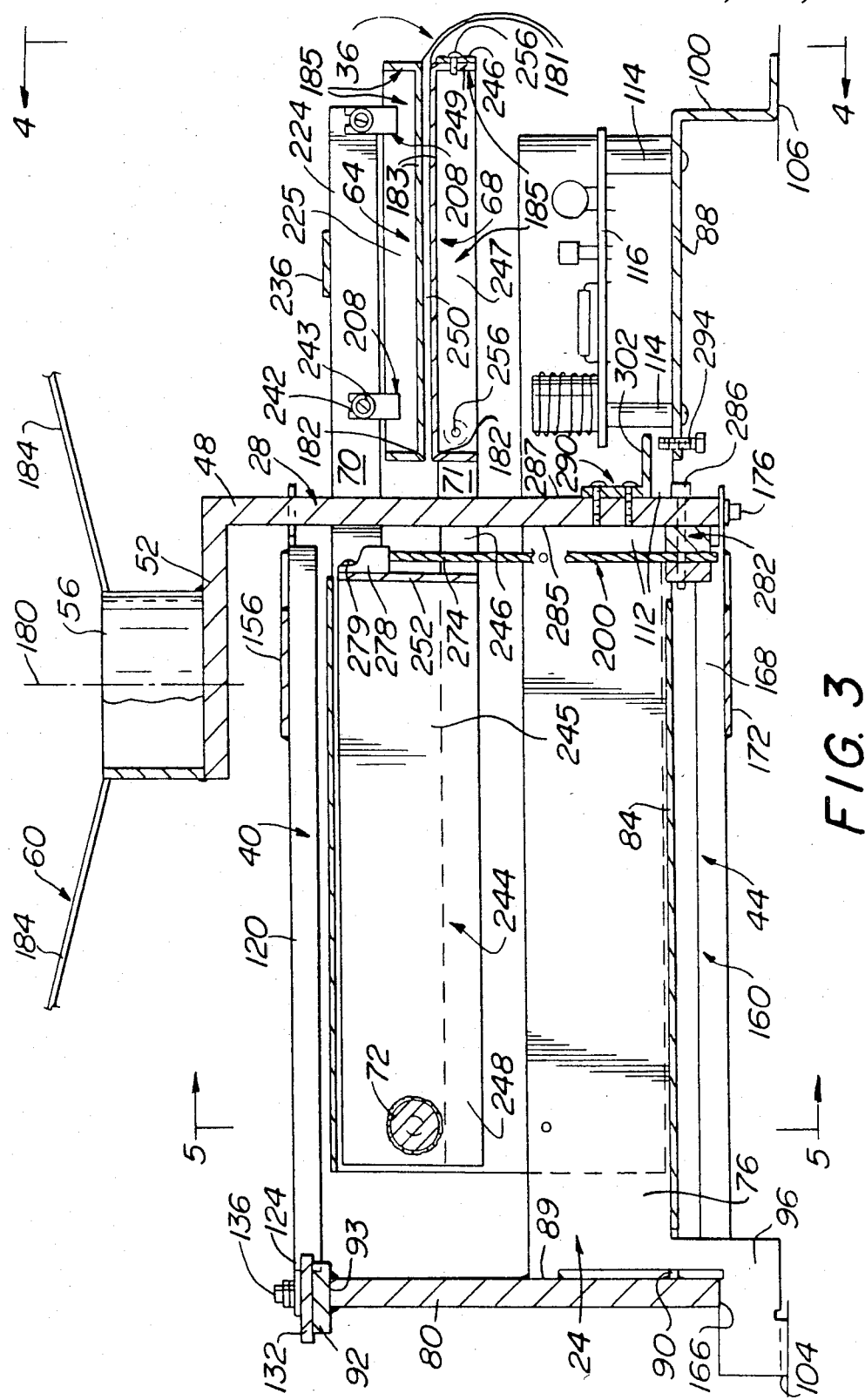
FIG. 3 is an enlarged sectional view taken along line 3—3 of FIG. 2.

The details of the frame assembly 24 and suspension system 28 will be described later, but suffice it for now to state that, as can be seen in FIG. 3, the suspension system 28 basically comprises upper and lower parallelogram members 40 and 44, respectively, and an interconnecting vertical column 48. An arm 52 extends horizontally from the top of the column 48 just above the upper parallelogram 40. A tubular column 56 is mounted on the arm and terminates at its upper end in a spider 60, upon which the pan 32 is mounted.

The transducer means 36 will be described in detail later, but basically comprises a variable capacitor including an upper plate 64 and a lower plate 68. The lower plate is arranged to be displaced either upward or downward with respect to the upper plate when the pan is loaded or unloaded, as the case may be. The upper plate is fixedly connected to the frame assembly 24, via upper plate support means 70, while the lower plate is mounted on the frame assembly by lower plate support means 71 and spring means 72. The lower plate 68 is also coupled to the pan 32 by the column 56, the arm 52, the column 48 and other elements of the suspension system 28, to be described later.

The spring means 72 comprises a rod or bar which is arranged to twist in order to permit displacement of the lower plate 68 relative to the upper plate 64. In this regard, movement of the lower plate is effected by the support means 71 which pivots about the central axis of the spring means 72.

The use of parallelogram members 40 and 44 in a scale suspension system is generally a conventional technique to insure that only the vertical component of the load is transferred to the pan's displacement detecting means. Therefore, only the vertical component of the load of the pan is transmitted to the lower capacitor plate 68 by the suspension system. Moreover, the suspension system counteracts all side loads and twisting moments (which might be applied to the pan) and rigidly resists all motions except for up/down movement. In accordance with one aspect of this invention, the upper parallelogram members 40 are adjusted using specially constructed adjustment means (to be described later) to insure that the parallelogram assembly is properly aligned in the up/down direction.

The plates 64 and 68 of the capacitor 36 are connected by electrical conductors (not shown) to the input of a variable frequency oscillator (not shown). The oscillator produces an electrical signal, whose output frequency is a function of the capacitance of the capacitor 36 and hence, a function of the vertical displacement of the weighing pan 32. The electrical signal from the variable frequency oscillator is acted upon by the electronic circuitry of the device 20 to provide a reading of weight, volume or density of the material placed on the pan. In this regard, the electrical circuitry of the apparatus is not generally shown or described in this application.

Figure 2:
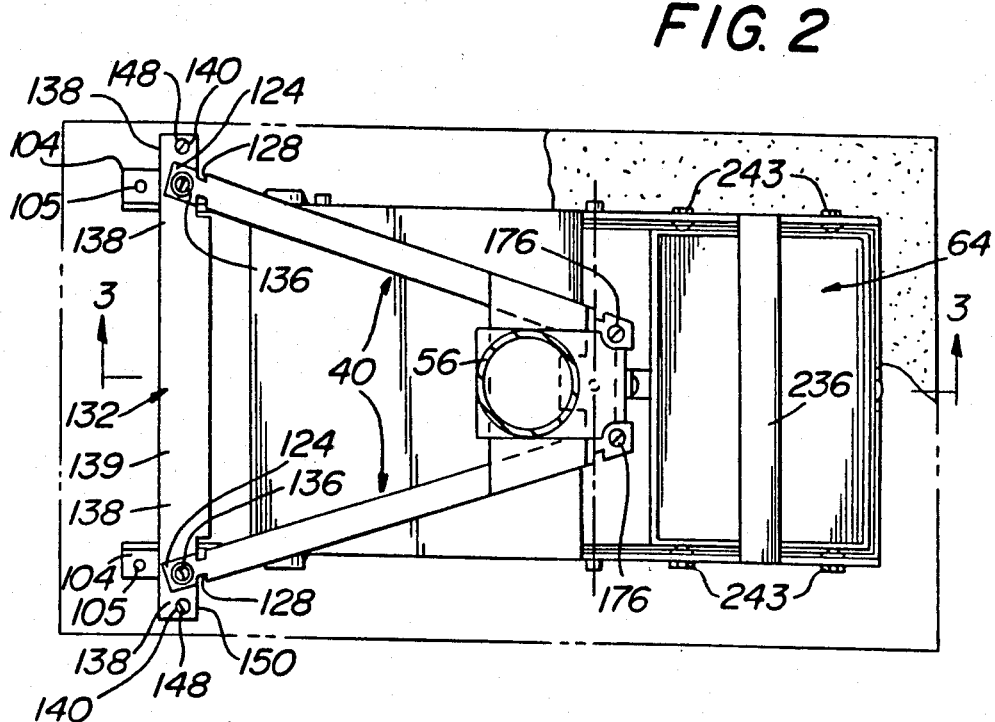
FIG. 2 is a top plan view of the electronic scale shown in FIG. 1 with the casing and platform removed.
Figure 4:
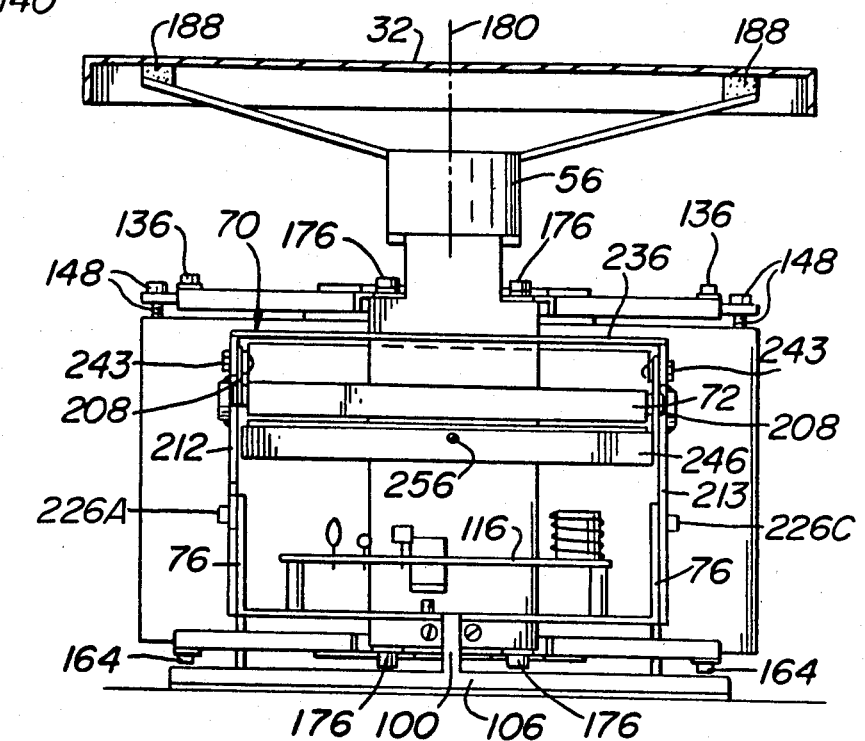
FIG. 4 is a reduced sectional view taken along line 4—4 of FIG. 3.

Referring now to the various Figures of the drawing, the details of the suspension system 28, the frame assembly 24, the capacitor 36, and the mounting means for the capacitor will be described in detail. Thus, as seen in FIGS. 2, 3 and 4 the frame assembly 24 is generally rectangularly shaped and is made up of plural bar-like, frame elements, namely a pair of side frame elements 76 (FIG. 4), an end frame element 80 (FIG. 3), a primary cross-frame element 84 (FIG. 3), a secondary cross-frame element 88 (FIG. 3) and the upper plate support means 70 (FIG. 3), as will be described later.

Referring to FIG. 3, in the preferred embodiment of the invention the side frame elements 76 and the primary cross frame element 84 are each joined (e.g., welded) to the end frame element 80 at right angles thereto. The respective connections between the side frame elements 76 and end frame element 80 are made along vertically disposed joints 89, while the connection between the cross frame element 84 and the end frame element is made along a horizontally disposed joint 90. The above described means for connection insures that the side frame elements do not twist or otherwise distort should the end frame element 80 twist or distort as a result of a heavy off-centered load being placed on the pan 32. This arrangement further insures that the side frame elements remain rigid with respect to the end frame element in the up/down direction under such circumstances. Obviously, it is desirable that the frame elements and in particular the side frame elements 76 do not twist or distort during the operation of the scale since the supporting bracket for the upper capacitor plate is connected thereto. Consequently, should any distortion of the side frame elements occur, it would result in the upper capacitor plate becoming misaligned with respect to the lower plate.

Twisting and distortion as just described is avoided due to the fact that the joints or connection points 89 and 90, respectively are relatively short (e.g., on the order of 1 cm.) so as to be approximately point-like and further due to the fact that only three connection joints are being used. Since each joint is short enough to generally approximate a point and the minimum number of points necessary to define a plane is three, regardless of how much the end plate twists or otherwise distorts, there exists a plane which passes through all three of the connection points 89 and 90, respectively. As a result, the three connection points on the frame elements 76 and 84, respectively (which always lie along a common plane) are able to be situated flush with the end frame element 80 without necessitating that the side frame elements or cross frame element bend or distort. This situation holds true irrespective of how much the end frame element 80 bends or distorts.

For the sake of comparison and contrast, if four or more connection points were instead to be used, the side frame elements 76 would have to twist or distort for the connection points 89 and 90 to remain flush against the end frame element 80, should the end frame element twist or distort.

Furthermore, the vertical joints 89 are each located along the horizontal axis 201 (FIG. 8) of the end plate (e.g., mid-way between the top edge and bottom edge of the end frame element) while the horizontal joint 90 is located along the vertical axis 202 of the end frame element. As a result of this arrangement and further in view of the fact that the end frame element 80 typically twists the most adjacent its corners and least adjacent its horizontal and vertical axes 200 and 202, respectively, when an off-centered load is placed on the weighing pan, the deflection of the plate adjacent the joints 89 and 90, respectively is at a minimum. Thus, the side frame elements and primary cross frame element also remain generally stationary as portions of the end frame element deflect or twist.

Various alternative embodiments of the scale, using alternative means for attaching the end frame element 80 to the side frame elements and cross-frame element in a manner also designed to reduce twist, distortion, etc. of the side frame elements is shown in FIGS. 9 and 10, respectively, of the drawing and shall be described in greater detail later on in this Patent Application.

The end frame element 80 is a generally thick, rectangular member. A spacer bar 92 which is fixedly secured to the top edge 93 of the end frame element 80 at an intermediate position along element 80. The spacer bar 92 operates in combination with a flexible adjustment bar (to be described later) to enable adjustment of the upper parallelogram assembly 40.

The primary cross-frame element 84 and the secondary cross-frame element 88, each comprise a generally rectangular, planar bar, which interconnects the bottom edges of the respective side frame elements 76. The primary cross-frame element 84 is connected to the respective side frame elements adjacent the rear portion of the scale (e.g., beneath the upper parallelogram assembly 40) and the secondary cross-frame element 88 is connected to the side frame elements adjacent the front portion of the scale (e.g., generally beneath the variable capacitor 36). Furthermore, there is a space between the respective cross-frame elements, as shall be described later.

The device 20 is supported by a set of legs arranged in a tripod configuration. The set of legs includes a pair of rear legs 96 and a front leg 100. Each rear leg 96 is integrally formed with and extends vertically downwardly from, a respective side frame element 76. Each rear leg 96 further includes a generally horizontal foot portion 104, having a mounting hole 105 (FIG. 2), which is used for bolting the scale 20 to a horizontal supporting surface (e.g., a cabinet).

The foot portions 104 are thin, generally malleable, planar members, which are able to bend in order to facilitate the mounting of the scale to an uneven surface, without causing the frame assembly to twist.

As can be seen in FIGS. 4 and 7, the front leg 100 is formed integrally with the secondary cross-frame element 88 at a position mid-way between the respective side frame elements 76. The front leg 100 (FIG. 7) extends downward and includes a thin, vertically extending stem portion 107 which is joined to an elongated, generally horizontal, planar foot portion 106 having a mounting hole (not shown), which is also used for mounting the foot to a horizontal surface. The stem portion is of generally planar, rectangular construction. The stem portion 107 is further constructed so as to be flexible, to insure that the frame assembly 24 will not incur any twisting or distortion when the legs are mounted on a non-level or uneven surface. Twisting or distortion of the frame assembly 24 is thus avoided since the stem portion 107 flexes or twists to accomodate the uneveness of the supporting surface.

The foot portion 106 of the leg 100 includes a horizontal base 101 (FIG. 7) which rests on the supporting surface and an upwardly extending flange 108 which is generally co-planar with and joined to the narrow stem portion 107.

The scale's suspension components are mounted on the frame assembly 24 and are located within a space between the end frame element 80 and the capacitor 36. The upper parallelogram member 40 is located generally above the side frame elements 76, and the lower parallelogram member 44 is located generally below the side frame elements. The area between the primary and secondary cross-frame elements 76 and denoted by the reference numeral 112 (FIG. 3), defines a space in which the interconnecting vertical column 48 is located.

The electrical components of the oscillator are located on a circuit board 116 which is mounted by standoffs 114 on the secondary cross-frame element 88 and between the respective side frame elements 76. The electrical components shown on the circuit board 116 are merely exemplary of the actual components used.

The upper and lower plates 64 and 68 of the capacitor are supported by the upper plate support means 70 and the lower plate support means 71, respectively, so as to locate the capacitor generally above the circuit board 116 and between the side frame elements 76.

The upper parallelogram member 40 comprises a pair of elongated legs 120, each of which is of U-shaped cross-section, except for its opposed end portions 124, (FIG. 2) which are planar. A pair of notches 128 are located in the opposed edges of the planar portions 124 to serve as flex points for the legs of the parallelogram.

In order to permit adjustment of the vertical angle of the legs of the upper parallelogram, a flexible adjustment bar 132 is interposed between the planar end portions 124 of the upper parallelogram member 40 and the spacer bar 92. The end portions 124 of the legs are thus mounted on the top surface of the adjustment bar 132. The adjustment bar is constructed as a generally planar member which is flexible in the up/down direction and rigid in all other directions. The mid-portion 139 (FIGS. 2 and 8) of the adjustment bar is attached (e.g., welded) to the top edge of the spacer bar 92.

As shown in FIG. 8, the adjustment bar 132 is upwardly biased at its respective ends 138, such that when said ends 138 are not restrained by a pair of machine screws, to be described later, the adjustment bar assumes an upwardly biased position as shown in phantom lines.

The adjustment bar 132 also includes respective mounting holes 140 adjacent each of its ends. The end frame elements 80 includes a correspondingly located pair of internally threaded holes 141 along its top horizontal edge so as to permit the bolts 148 to extend through the respective mounting holes 140 and engage the respective internally threaded holes 141.

Since the intermediate portion 139 of the adjustment bar is fixedly joined to the spacer bar and its respective ends are screwed to the end frame element as just described, the height of the respective ends are readily raised or lowered by rotating the adjustment screws 148 in a counter-clockwise or clockwise direction, respectively. Thus, when the adjustment bolts 148 are rotated in a counter-clockwise direction, the end portions of the bar move upward as a result of the upward biasing force of the adjustment bar. Conversely, when the bolts are rotated in a clockwise direction, the end portions of the bar are pulled downward toward the top edge of the end frame element 80. It should also be appreciated that each end of the adjustment bar is readily adjusted independently of the other, as desired.

The adjustment bar 132 also includes a pair of recesses 150 adjacent its respective ends to accommodate the downwardly directed portions of the U-shaped parallelogram legs. Since each leg 40 of the upper parallelogram is attached to the adjustment bar 132, the height of the end portions of each leg and thus, their respective vertical angles are readily adjusted by tightening or loosening the respective adjustment bolts as just described.

As can be seen in FIG. 2, the legs of the parallelogram 40 extend at an acute angle to each other, with the free ends of the legs being located in space 112. The free ends of the parallelogram legs are interconnected by means of a notched plate 156 (FIG. 3), which is attached to the top surface of the respective legs, under the tubular column 56.

The lower parallelogram 44 is constructed in an identical manner to the upper parallelogram and includes a pair of legs 160 which are mounted at one end to the bottom horizontal edge 166 of the end frame element 80, via screws 164 (FIG. 4). The free end portion 168 of the legs of the lower parallelogram also terminate within the space 112 and directly below the free ends of the upper parallelogram legs. The free ends of the lower parallelogram legs include a notched plate 172 which is identically constructed and attached to the lower parallelogram legs as plate 156 is with regard to the upper parallelogram legs.

The interconnecting column 48 is a rigid, elongated, generally rectangular member which is mounted between the opposed free ends of the two parallelogram members, via respective screws 176. The upper portion of the column 48 includes a pair of notched shoulders 178 (FIG. 5) to which the free ends of the upper parallelogram legs are screwed and a generally planar bottom edge 179 to which the free ends of the lower parallelogram legs are screwed.

The arm 52 is secured to the top of the interconnecting column 48 (i.e., above the shoulders 178) and as previously notch, extends parallel to the parallelogram legs. Moreover, the free end of the arm 52 is located approximately central with respect to the space 112. The tubular column 56 is mounted on the free end of the interconnecting arm 52, with the longitudinal axis of the column, denoted by the broken line 180, defining the center line for the apparatus pan 32.

The spider 60 includes four angularly extending arms 184 (only two of which are shown). Each arm terminates at its free end in a vibration-dampening cushion 188 (FIG. 4). The pan 32 is a generally planar member of rectangular shape and having a downwardly projecting flanged peripheral edge 192. The pan is arranged to be disposed on the vibration-dampening cushions 188 of the spider for support thereon.

As will be appreciated from the foregoing, when a body or load is placed on the pan, irrespective of its position on the pan, only the vertical component of the load is applied to the free end of the arm 52 along axis 180 (FIG. 4).

The details of the suspension system 28, the capacitor 36, the upper plate support means 70 and the lower plate support means 71 will now be described. The upper plate 64 of the capacitor 36, like the lower plate 68, is a generally planar metallic member, of generally rectangular shape. Each plate includes a far edge 181, a near edge 182 and a pair of parallel side edges 183, around which a flanged portion 185 is connected. The flanged portions of the upper and lower plates are connected to the respective support means 70 and 71 and to associated electrical conductors (not shown). Thus, the upper plate 64 is fixedly mounted to the frame 24 by the upper plate support means 70, while the lower plate 68 is pivotably connected to the frame assembly 24 by the lower plate support means 71 and the spring means 72. Furthermore, the lower plate is also coupled to the pan 32 via the vertical column 48, the suspension system 28 and a cable assembly 200.

The spring means 72 serves to bias the lower plate 64 upwardly towards the upper plate 64 to a neutral or null position against the downward urging of the suspension system and cable assembly when a load is placed on the pan. As will be described below, the greater the weight of the load on the pan the further the lower plate is displaced downward relative to the upper plate. This action thus increases the air gap between the capacitor plates, thereby decreasing the capacitance of the capacitor 36. The changed capacitance is sensed by the electronic circuitry to provide an indication of the weight on the scale's pan.

Figure 5:
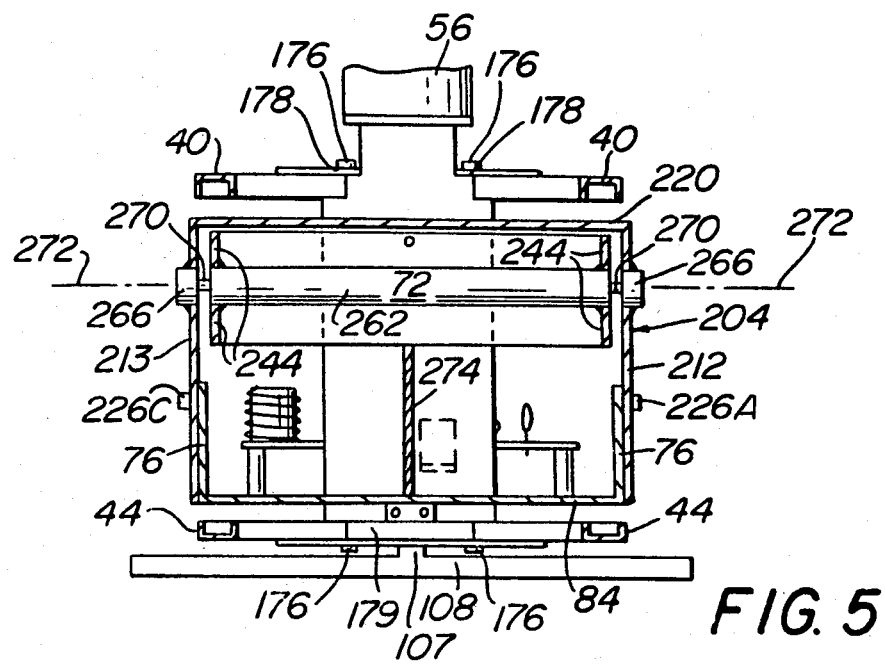
FIG. 5 is a reduced sectional view, partially broken away, taken along line 5—5 of FIG. 3.

The upper plate support means 70 comprises an upper frame assembly 204 (FIG. 5) and a plurality of strap members 208 (FIG. 3). The upper frame assembly 204 is a very rigid one-piece unit comprising a pair of vertical side walls 212 and 213, respectively, a bridging top wall 220 and a pair of arms 224 (FIG. 3), each arm projecting forward from an associated side wall. As can be seen in FIGS. 4, 5 and 6, the side walls 212 and 213 are connected to respective side frame element 76 by three mounting screws 226A, 226B and 226C, respectively. The upper frame assembly 204 when mounted as just described is located between the upper and lower parallelogram assemblies, with each arm 224 extending from its respective side wall in a generally co-planar, horizontal direction and disposed generally above the side edges of the secondary cross-frame element 88. A crossbar 236 interconnects the respective arms 224 at an intermediate location to insure that the arms remain parallel and rigid with respect to each other.

The sidewall 212 (FIG. 5) contains a pair of mounting holes (not shown) for receipt of the mounting screws 226A and 226B, respectively, while sidewall 213 (FIGS. 5 and 6) contains a generally "T-shaped" finger portion 215 which includes a single mounting hole (also not shown) for receipt of a mounting screw 226C. Thus, the upper frame assembly 204 is mounted to the frame assembly 24 by means of three mounting screws, with two of the screws 226A and 226B connecting the side wall 212 to one side frame element 76 and the third mounting screw 226C connecting the finger portion 215 of the side wall 213 to the other side frame element 76.

The three screw arrangement and the utilization of the finger portion 215 serve to prevent twisting of the frame elements from being transmitted to the upper frame assembly 204 (as would generally occur when an off-centered load is applied to the weighing pan 32). This, distortion of the frame elements is not readily transmitted to the upper frame assembly so as to cause the upper capacitor plate to become misaligned with respect to the lower plate.

Referring to FIG. 6, it can be seen that two of the mounting screws 226A and 226C, respectively are disposed along an axis 223 perpendicular to the plane of the side frame elements 76 and which intersects the axis of the scale's cable 276, which shall be described later. Suffice it for now to state that the cable is part of an assembly used for coupling the pan 32 to the lower capacitor plate. This coaxial mounting arrangement insures that the load on the weighing pan does not produce a tipping moment on the support bracket 204. The third screw 226B serves to provide additional stability to the support bracket. In this regard, the third bolt 226B is horizontally displaced from the bolt 226A, so as to be located adjacent the rear portion of the side wall 212.

The finger portion 215 is co-planar with the sidewall 213. It comprises a very thin and flexible vertical stem 218 and a mounting portion 219. The vertical stem 218 is connected at one end to the side portion 213 (adjacent its bottom edge) and terminates at its opposite or free end 216 to form the mounting portion 219, which includes the above mentioned mounting hole. A generally vertically extending slot 221 is thus formed between the finger portion and the side portion 213. It should thus be appreciated that the slot 221 narrows or enlarges as the stem portion 218 flexes, thus accommodating the twisting of the frame assembly 24, without concomitant twisting of the upper frame assembly 204.

The strap members 208 are thin strips which serve to suspend the upper capacitor plate from the arms 224. In this regard, each strap is bolted at one end to a respective arm 224 and is adhesively secured at its opposite end to an insulator (not shown) which is adhesively secured to a lateral side portion 225 of the flange of the upper capacitor plate. In the preferred embodiment of the invention, four such straps are used, with two straps being attached to each side portion 225 and arranged so that there is a strap situated adjacent each of the four respective corners of the upper plate.

Referring to FIG. 3, each strap is a very thin, planar and generally rectangular member having a slot 242 adjacent its upper end. Each slot serves as a mounting opening for securing the strap onto the end being connected to the upper frame assembly arm 224 via an associated screw 243. The slot permits adjustment of the position or angle of the upper plate by varying the position of the straps relative to the arm 224. Thus, the gap 250 between the upper and lower plates can be adjusted or calibrated readily by loosening the mounting screws, accurately positioning the capacitor plate and then tightening the screws.

Referring to FIG. 3, the lower plate support means 71 is mounted on the frame by the spring 72 (as will be described later) and basically comprises a generally rectangular support bracket 244. The support bracket 244 is constructed of a relatively thick walled base portion 245 and a pair of projecting arms 246. The thick base portion 245 is very rigid, particularly in the up-/down direction so as to minimize the effects of non-torsional stresses and strains which may be encountered. The base portion comprises a pair of parallel side walls 248 which are disposed generally parallel to and adjacent (but free of contact with) the side walls 204 of the upper plate supporting bracket. The side walls are interconnected by means of a thick vertical front wall 252 which is disposed generally parallel and adjacent the vertical column 48.

The arms are each thin elongated planar strips, extending horizontally in a vertical plane from the sidewalls of the base 245. Thus each arm is rigid in an up-/down direction, but flexible in all other directions. Each arm is attached (e.g., welded) to the outer surfaces of the respective side walls 248 of the base portion 245. The outermost end of the arms are joined by a bridging strip integrally formed with the arm to form a generally "U"-shaped configuration. This U-shaped projection is configured to encircle the periphery of the lower capacitor plate 68 to serve as the mounting means therefor. Thus, respective portions of the strap are parallel to the respective side portions 247 and the front portion 249 of the lower plate and are attached thereto by a set of three mounting screws 256. Each of the three mounting screws connects a portion of the strap to the left side, right side, and front flange portions, respectively, of the lower capacitor plate.

Since the arms 246 and the bridging portion of the bracket are rigid in the up/down direction but flexible in all other directions and further because each arm and the bridging portion is only connected to a respective flange portion of the plate at a single point (e.g., using one mounting screw), the arms and bridging portion flex inward or outward as necessary in order to accomodate thermal expansion or contraction of the lower plate, without distorting or producing significant amounts of stress on the plate. Similarly, the bracket also flexes to accommodate mismatches between the size of the plate and the bracket, attributable to various other causes, e.g., manufacturing inaccuracies.

As mentioned earlier the support bracket 244 (FIG. 5) is mounted on the upper frame assembly 204 by the spring means 72. The spring means 72 basically comprises an elongated cylindrical member or bar formed of a strong, yet resilient metal, (e.g., stainless steel), and having a pair of reduced diameter neck sections 270, each adjacent a respective end 266 of the bar. Each end 266 of the bar is fixedly secured to a respective sidewall 212 of the upper frame assembly. The reduced diameter neck portions 270 are of substantially smaller cross-section than the remainder of the bar and thus serve as the actual spring means of the device by being the twist site when a torque is applied to the intermediate portion 262 of the bar relative to the end portions thereof. In this regard, each neck portion is of relatively short length (e.g., approximately $2\frac{1}{2}$ times its diameter) to minimize any bending which might occur along these portions. However, as a practical consideration the shortness of these portions is limited by the fact that the shorter the length, the greater is the twist per unit of length and stress.

The securement of each end of the bar 72 is as follows: the outer portions 266 of the bar extend through respective holes in the side wall 212 of the upper frame assembly and are welded in place. The sidewalls 244 of the lower capacitor support bracket are also fixedly secured to the bar. To that end, portions of the intermediate portion 262 of the bar contiguous with each neck portion extend through an associated bore in an associated side walls 244 of the lower capacitor support bracket and are fixedly attached, (e.g., welded) thereto.

As a result of the foregoing arrangement, it should be appreciated that inasmuch as the reduced thickness portions 270 are of lesser cross-section than the other portions of the bar 72, when a force is applied to the lower capacitor plate mounting bracket 244 as a result of weight being added to the pan 32, the reduced thickness portions 270 of the bar 72 rotate or twist evenly about the longitudinal central axis 272 of the bar. Thus, the intermediate portion 262 of the bar rotates along with the lower capacitor plate mounting bracket 244, relative to the end portions 266 of the bar and the upper frame assembly 204.

It should further be appreciated that when weight is removed from the pan, the biasing tension of the bar causes the bar to twist in the opposite direction (e.g., toward an untwisted position or state), resulting in the lower plate support means 71 and lower capacitor plate 68 pivoting in a generally upward direction. Thus the lower plate pivots towards the upper plate to produce a corresponding change in capacitance to indicate a reduced amount of weight on the pan 32.

It should still further be appreciated that in a commercial embodiment of the device 20, its electronic circuitry is calibrated so that when the spring 72 is at equilibrium under the weight of an empty weighing pan 32, the display means indicates a weight of zero. Furthermore, in its preferred embodiment, the scale is constructed so that even when there is no load on the pan 32, there will still remain a gap 250 between the respective capacitor plates 64 and 68.

The cable assembly 200 serves as means for coupling the lower plate support means 71 to the vertical column 48 and hence to the pan 32. As best shown in FIG. 3, the cable assembly 200 basically comprises a metal, non-stretchable cable 274, an upper clamp assembly 278 and a lower clamp assembly 282. The upper clamp assembly 278 is attached by a screw 279 to the front surface of the front wall 252 of the lower plate support means 71 at a central position with respect thereto. The cable 274 is fixedly secured to the upper clamp assembly 278 in a conventional fashion. The lower end of the cable is secured by the lower clamp assembly 282 to the lower portion of the vertical column 48. In this regard, the lower clamp assembly 282 is attached to the vertical column 48 at a central position with respect to the column 48. The lower clamp assembly 282 includes a central opening through which the lower end of the cable passes and is secured by two perpendicularly disposed screws 286. The screws engage the clamp assembly 282 to hold the cable in place and when the screws are loosened, one can vary the effective length of the cable to approximately set the gap between the two capacitor plates. However, the precise gap 250 between the plates, is adjusted as mentioned before, by loosening the screws 243 and moving the straps 208.

As can be seen in FIG. 3 the lower clamp assembly 282 is constructed to situate the end of the cable to which it is connected, a predetermined horizontal distance from the rear planar surface 285 of the vertical column, to dispose the cable vertically within the space 112, between the front wall 252 and the vertical column 48.

In view of the foregoing discussion and description, it should readily be appreciated that movement of the vertical column 48 in a downward direction pulls the cable 274 in a downward direction. Since the cable 274 is connected to the front plate 252 of the lower capacitor mounting bracket 244, downward movement of the cable pulls downward on the front plate 252 of the lower capacitor mounting bracket, causing the reduced thickness portions 270 of the bar 72 to twist and the mounting bracket to pivot downward about the central axis 272 of the bar. The downward rotation of the mounting bracket causes the planar surface of the lower capacitor plate to move in a generally downward direction, thus increasing the gap 250 between the upper and lower plates.

Conversely, movement of the vertical column 48 in an upward direction reduces the tension in the cable 274 enabling the bar 72 to untwist (e.g., move towards an untwisted equilibrium state), resulting in the lower capacitor mounting bracket 244 pivoting upwardly. Upward pivoting of the bracket 244 causes the lower plate 68 to move upwardly so as to reduce the size of the gap 250 between the respective plates 64 and 68.

In order to prevent overtravel of the lower capacitor plate downward, the vertical column 48 further includes a stop member 290 (FIG. 3) which coacts with a set screw 294 to limit the downward vertical movement of the column. The stop member 290 comprises an "L"-shaped bracket which is bolted to the front surface 287 of the vertical column at a slightly off center position. The free end of the set screw 294 is threaded through the secondary cross-plate 88 and extends a predetermined distance upwardly therefrom, to engage a horizontal leg 302 of the bracket 290 at the downward most position of the lower plate.

As should be appreciated by those skilled in the art the maximum amount of weight which can be placed on the pan can be readily adjusted within predetermined limits by rotating the set screw 294 to either increase or decrease how far its free end extends above the secondary cross bar 88.

The electrical components as shown in various Figs. of the drawing, are merely exemplary of components used in an actual embodiment of the device, are of conventional construction and arrangement. Thus, the actual electronic components and circuitry need not be described in detail herein. Suffice it to state for now that the electrical components include variable frequency oscillator means which produces an electrical signal whose frequency corresponds to the electrical capacitance of the capacitor 36. This electrical signal is readily used for producing another signal indicative of the weight or other measurements relating to the object on the weighing pan 32. Additionally, the electrical components of the scale 20 include solid state memory or storage means and microprocessor means, including an algorithm for effecting the various calculations and routines required.

As shown in FIG. 9, one alternative embodiment of the invention includes a vertically disposed wedge-shaped brace member 302, for joining the end frame element 80 to the other frame elements. In this regard, the wedge-shaped brace member 302 can either be used in place of the joints 89 and 90 (FIG. 3) of the preferred embodiment or alternatively, can be used in addition to those joints to enhance the connection strength between joints 89 and 90. The wedge-shaped brace member 302 is in the form of a right triangle having a vertically extending leg 304, a horizontally extending leg 306 and a hypotenuse 308. The upwardly extending leg 304 is joined (e.g., welded) to the end frame element 80 along its vertical axis 202 and the horizontal leg 306 is joined (e.g., welded) to the cross-frame element 84 along a horizontal line which is perpendicular to the end frame element and located mid-way between the respective side frame elements 76. It should further be appreciated from FIG. 9 that the wedge-shaped brace member 302 affords enhanced strength to the frame assembly, yet insures that twist or distortion of the end frame element 80 is not readily transmitted to other portions of the frame assembly.

A second alternative embodiment for joining the end frame element 80 to the other portions of the frame assembly 24 is shown in FIG. 10. In this regard, the alternative embodiment shown in FIG. 10 comprises a joining portion in the form of a "V"-shaped brace member 310. The V-shaped brace member 310 is formed as an integral unit of several sections, each of which extends horizontally in a vertical plane. In this regard, the V-shaped brace member 310 includes a narrow rectangular base section 312 and a pair of angularly extending leg sections 314. Each leg section merges with a vertical edge of the base portion 312 at one side and terminates at its free end in a side mounting section 316. Each side mounting section 316 forms an obtuse angle with its respective leg, enabling the mounting section to lie flush (e.g., parallel) with its corresponding side frame element 76 when the base portion 312 is positioned flush against the end plate 80. Each side mounting section 316 is joined (e.g., welded) to a respective side frame element 76 and the base portion 312 is joined (e.g., welded) to the end frame element 80 along the end frame element's vertical axis 202.

The joining member 310 is also used either in place of or alternatively, in combination with the joints 89 and 90 to provide enhanced structural strength to the frame assembly 24.

As will be appreciated from the foregoing discussion, the instant invention includes features which counteract the effects of off-centered loads on the scale's weighing pan, an uneven supporting surface or twisting moments likely to be encountered by the scale, to provide a scale capable of weighing an object with great accuracy and precision.

Without further elaboration, the foregoing will so fully illustrate my invention that others may, by applying current or future knowledge readily adapt the same for use under various conditions of service.

I claim:

1. A scale comprising frame means including a vertically extending plate having a top edge, platform means arranged to move upon receipt of some material thereon, position sensing means coupled to said platform means to indicate the amount of weight on said platform means and a suspension system for coupling said platform means to said frame means, said suspension system serving to prevent weighing inaccuracies from occurring as a result of an off-centered load being placed on said platform means and comprising a pair of leg members each of which is coupled at one end by first coupling means to said platform means and at an opposite end by second coupling means to said frame means, said second coupling means including a horizontally disposed elongated member which rests upon the top edge of said vertically extending plate and adjustable securement means, said elongated member being flexible in an up/down direction and including an intermediate portion and a pair of upwardly biased free ends, said intermediate portion being fixedly attached to said top edge of said plate and each respective free end being adjustably secured to said plate by said adjustable securement means, whereupon each of said leg members is connected to said elongated member adjacent a respective free end such that the vertical angle of each respective leg is readily adjusted using said adjustable securement means, whereby a respective leg member is lowered by manually positioning the adjustable securement means so as to urge the free end of the elongated member downward and is raised by manually positioning said adjustable securement means so as to permit said upwardly biased free end to move upward.

2. The scale of claim 1, wherein said elongated member is generally planar in a generally horizontal plane.

3. The scale of claim 1, wherein said adjustable securement means comprises a pair of screws and a pair of correspondingly located internally threaded holes in the top edge of said plate, whereupon each of said screws is connected to a respective free end of said elongated member and arranged to threadedly engage a corresponding bore so as to pull said free end downward when said screw is rotated in a first rotational direction and to permit said free end to move upward due to its upward bias when said screw is rotated in the opposite rotational direction.

4. The scale of claim 3, wherein the top edge of said plate includes a pair of recesses, each of said recesses being located adjacent a respective end of said top edge and adjacent the adjustable securement means, such that the free ends of said elongated member are free to move within the spaces defined by the respective recesses.

5. The scale of claim 1, wherein said elongated member is rigid in all directions but for the up/down direction.

6. A scale comprising frame means, platform means arranged to move upon receipt of some material thereon, spring means coupled both to said frame means and to said platform means, variable capacitance means including a first plate and a second plate, said first plate including a generally planar horizontal surface and a generally vertical disposed flanged portion located about the periphery of said horizontal surface and bracket means for coupling said first plate to said spring means, wherein said bracket means comprises a generally rigid portion adjacent said spring means and a thin portion which is connected to said flanged portion of said plate, said thin portion being rigid in an up/down direction but flexible in a horizontal plane, whereupon when said thin portion is attached to said first plate said thin portion is readily able to bend in a horizontal plane to accommodate changes in size or shape of said first plate attributable to thermal effects or other causes, should such occur.

7. The scale of claim 6, further comprising at least one fastening member, wherein said flange portion comprises a plurality of surfaces, each of said surfaces extending horizontally in a vertical plane, whereupon said thin portion is attached to one or more of said surfaces by means of not more than one fastening member for each respective surface.

8. The scale of claim 7, wherein said first plate is generally rectangular in shape comprising four flanged surfaces, with said thin portion of said bracket being connected to three of said four surfaces by three respective fastening members.

9. A scale comprising frame means including first and second vertically extending frame elements, platform means arranged to move upon receipt of some material thereon, spring means coupled both to said frame means and to said platform means, variable capacitance means including a movable plate and a stationary plate with said movable plate being coupled to said platform means by movable support means and said stationary plate being disposed adjacent and facing said movable plate by generally rigid bracket means, whereupon movement of said platform means upon receipt of said material thereon causes a displacement in said movable plate relative to said stationary plate, producing a signal indicative of the weight of said material, said bracket means comprising first and second generally vertically extending side portions, a bridging portion and projecting means, said projecting means being connected to and supporting said stationary plate, whereupon said first side portion includes a flexible finger portion having a free end, said finger portion being generally coplanar with said first side portion and said free end being joined to one of said vertically extending frame elements, said second side portion being joined to the other of said frame elements such that any twisting or distortion of said frame means results in said finger portion flexing, thus preventing distortion or twist from being transmitted to the remaining portions of said bracket means so as to produce a positional change in said stationary plate.

10. The scale of claim 9, wherein said first side portion is joined to one of said frame elements at a single first point corresponding to the free end of said finger portion and said second side portion being joined to said other frame element at both a second and a third point.

11. The scale of claim 10 further comprising vertically extending cable means for coupling said platform means to said movable plate, wherein a straight line perpendicular to said frame elements and extending from said first point to said second point approximately intersects said cable means.

12. The scale of claim 11, wherein said bracket means is attached to said frame means at not more than three points.

13. The scale of claim 9, wherein said finger portion is generally vertically extending from said side portion.

14. The scale of claim 13, wherein said finger portion is spaced from said first side portion of said bracket means by a generally vertically extending recess.

15. The scale of claim 14, wherein said finger portion includes an enlarged mounting member adjacent its free end, said mounting member including a hole for receipt of a mounting screw.

16. The scale of claim 10, wherein said second connecting point is generally horizontally spaced from said third connecting point.

17. A scale comprising frame means, platform means arranged to move upon receipt of some material thereon, spring means coupled both to said frame means and to said platform means, displacement sensing means coupled both to said frame and to said platform means, whereupon displacement of said platform means causes said displacement sensing means to produce a signal indicative of the weight of said material, said frame means comprising a pair of generally parallel, vertically extending side frame elements, a vertically extending end frame element which is at generally right angles to said side frame elements and a horizontally disposed cross-frame element interconnecting said side frame elements, said end frame element being joined to said side frame and said cross frame elements, respectively at not more than three joints, said three joints including a first joint, a second joint and a third joint such that said first and second joints connect said end frame element to respective side frame elements and are located adjacent the horizontal center line of said end frame element and said third joint connects said end frame element to said cross frame element and is located adjacent the vertical center line of said end frame element, whereupon twisting or distortion of said end frame element due to an off-centered load resting on said platform means is not readily transmitted to said side frame elements and thus, does not cause said side frame elements to twist or distort in a manner which would tend to introduce error into the weighing process.

18. The scale of claim 17, wherein said first and second joints are each short and vertically extending and said third joint is short and horizontally extending, with each of said joints thus approximating single points of connection between said end frame element and the side and cross frame elements, respectively.

19. The scale of claim 18, wherein said end frame element is joined to said side frame elements and said cross frame element by means of joints which are welded.

20. A scale comprising frame means, platform means arranged to move upon receipt of some material thereon, position sensing means coupled to said platform means, spring means coupled both to said frame means and to said platform means and support means for supporting the scale on a generally horizontally disposed surface, said support means comprising first, second and third leg members wherein said first leg member includes a flexible, generally vertically extending stem portion which readily bends or twists so as to dispose the scale in a horizontal fashion and prevents undue twisting of the frame means when the scale is being supported by an uneven surface.

21. The scale of claim 20, wherein said support means comprises not more than three leg members.

22. The scale of claim 21, wherein only said first leg member is flexible.

23. The scale of claim 20 wherein the stem portion of said first leg member is generally planar.

24. The scale of claim 20, wherein said leg members are integrally formed with said frame means.

25. The scale of claim 20 wherein each of said leg members further comprises a generally flexible, horizontal foot portion, each of said foot portions including a mounting hole for mounting said scale to said supporting surface.

26. The scale of claim 20, wherein said first leg member is located generally adjacent said position sensing means and said second and third leg members are located generally adjacent said spring means.

27. A scale comprising frame means, platform means arranged to move upon receipt of some material thereon, spring means coupled both to said frame means and to said platform means, displacement sensing means coupled both to said frame and to said platform means, whereupon displacement of said platform means causes said displacement sensing means to produce a signal indicative of the weight of said material, said frame means comprising a pair of generally parallel, vertically extending side frame elements, a vertically extending end frame element which is at generally right angles to said side frame elements and a horizontally disposed cross-frame element interconnecting said side frame elements, said end frame element being joined to said cross frame element by a bridging member having a vertically extending leg and a horizontally extending leg, said vertically extending leg being joined to said end frame element along its vertical axis and said horizontal leg being attached to the cross-frame element such that twisting or distortion of said end frame element due to an off-centered load resting on said platform means is not readily transmitted to said side frame elements and thus, does not cause said side frame elements to twist or distort in a manner which would tend to introduce error into the weighing process.

28. The scale of claim 27, wherein said bridging member is generally wedge shaped.

29. A scale comprising frame means, platform means arranged to move upon receipt of some material thereon, spring means coupled both to said frame means and to said platform means, displacement sensing means coupled both to said frame means and to said platform means, whereupon displacement of said platform means causes said displacement sensing means to produce a signal indicative of the weight of said material, said frame means comprising a pair of generally parallel, vertically extending side frame elements, a vertically extending end frame element which is at generally right angles to said side frame elements and a horizontally disposed cross-frame element interconnecting said side frame elements, said end frame element being joined to said side frame elements by a generally V-shaped bridging member, said member including a pair of legs and a base portion, said legs being joined together at said base portion, wherein the free end of each leg is joined to a respective side frame element and the base portion is joined to the end frame element generally along its vertical axis such that twisting or distortion of said end frame element due to an off-centered load resting on said platform means is not readily transmitted to said side frame elements and thus, does not cause said side frame elements to twist or distort in a manner which would tend to introduce error into the weighing process.

30. The scale of claim 29, wherein said bridging member comprises generally planar members which extend horizontally in a vertical plane.

31. A scale comprising frame means including a vertically extending end plate and a pair of vertically extending side frame elements, platform means arranged to move upon receipt of some material thereon, a suspension system for coupling said platform means to said frame means, variable capacitance means including a stationary plate and a movable plate, movable support means for coupling said movable plate to said platform mean, stationary support means for supporting said stationary plate and leg support means for supporting the scale on a generally horizontal surface, wherein said suspension system serves to prevent weighing inaccuracies from occurring due to off-centered loads being placed on said platform means and comprising a pair of legs each of which is coupled at one end to said platform means and at an opposite end to said frame means, said means for coupling said legs to said frame means including a horizontally disposed elongated member which rests upon the top edge of the vertically extending plate and adjustable securement means, said elongated member being flexible in an up/down direction and including an intermediate portion and a pair of upwardly biased free ends, said intermediate portion being fixedly attached to the top edge of said end plate and each respective free end being adjustably secured to said plate by said adjustable securement means, whereupon each of said leg is connected to said elongated member adjacent a respective free end such that the vertical angle of each respective leg is readily adjusted using said adjustable securement means, whereby a respective leg is lowered by manually positioning the adjustable securement means so as to urge the free end of the elongated member downward and is raised by manually positioning the adjustable securement means so as to permit the upwardly biased free end to move upward, said movable capacitor plate including a generally planar horizontal surface and a generally vertically disposed flanged portion located about the periphery of said horizontal surface, wherein said movable support means for coupling said movable plate to said spring means comprises bracket means, said bracket means comprising a generally rigid portion and a thin portion, said rigid portion being adjacent said spring means and said thin portion being connected to said flanged portion of said movable plate and being rigid in an up-/down direction but flexible in other directions, whereupon said thin portion is readily able to bend in a horizontal plane to accommodate changes in size and shape of said movable plate, said stationary plate being coupled to said frame means by bracket means comprising interconnected first and second vertically extending side portions and projecting means, said projecting means being connected to and supporting said stationary plate, whereupn said first side portion includes a flexible finger portion having a free end, said finger portion being generally co-planar with said first side portion and said free end being joined to one of said vertically extending side frame elements, said second side portion being joined to the other vertically extending side frame element such that any twisting or distortion of said frame means results in said finger portion flexing, thus preventing the distortion or twist from being transmitted to the remaining portions of said bracket so as to produce a positional change in the stationary plate, said vertically extending plate being coupled to said side frame elements and a cross frame element at generally right angles thereto and at not more than three joints, said three joints including a first joint, a second joint and a third joint such that the first and second joints connect the vertical plate with respective side frame elements and are located adjacent the horizontal center line of said end plate and the third joint connects the vertical plate to the cross frame element and is located adjacent the vertical center line of said end plate, whereupon twisting or distortion of said end plate due to an off-centered load being placed on the platform means is not readily transmitted to the side frame elements and thus does not cause the side frame elements to twist or distort in a manner which would introduce error into the weighing process, said leg support means comprising first, second and third leg members wherein said first leg member includes a flexible, generally vertically extending stem portion which is able to bend or twist so as to dispose the scale in a horizontal fashion and prevent any undue twisting of the frame means from occurring when the scale is being supported by an uneven surface.

* * * * *